United States Patent [19]

Piazzola

[11] Patent Number: 4,628,191
[45] Date of Patent: Dec. 9, 1986

[54] ELECTRIC THERMAL UNIT

[76] Inventor: Gaetano Piazzola, Via Borri, 148, 21100 - Varese, Italy

[21] Appl. No.: 588,678

[22] Filed: Mar. 12, 1984

[30] Foreign Application Priority Data

Mar. 17, 1983 [IT] Italy ............................. 20130 A/83

[51] Int. Cl.⁴ ........................................... H05B 3/58
[52] U.S. Cl. ................................. 219/535; 219/536; 219/550
[58] Field of Search ............................. 219/532–535, 219/536, 539, 537, 550, 549, 552; 338/213, 317; 174/138 J

[56] References Cited

U.S. PATENT DOCUMENTS

| 1,855,092 | 4/1932 | Browne | 219/550 X |
| 2,549,944 | 4/1951 | Steiner | 219/550 |
| 2,614,480 | 10/1952 | Elmer | 219/535 X |
| 2,722,597 | 11/1955 | Steiner | 219/550 X |
| 3,036,187 | 5/1962 | Goldstand et al. | 219/539 |
| 3,045,097 | 7/1962 | Sellers | 219/539 |
| 3,548,159 | 12/1970 | Ellstroem | 219/535 |
| 3,590,206 | 6/1971 | Lago | 219/535 |
| 3,694,628 | 9/1972 | McGwire et al. | 219/550 |
| 3,887,790 | 6/1975 | Ferguson | 219/535 |
| 4,255,649 | 3/1981 | Fisher | 219/550 |

FOREIGN PATENT DOCUMENTS

| 133618 | 6/1933 | Austria | 219/550 |
| 813508 | 5/1959 | United Kingdom | 219/550 |
| 833045 | 4/1960 | United Kingdom | 219/550 |

Primary Examiner—E. A. Goldberg
Assistant Examiner—M. M. Lateef
Attorney, Agent, or Firm—Bucknam and Archer

[57] ABSTRACT

An electric thermal unit comprises a spiral coil resistance heater incorporated in a ring-like structure formed by mutually fastened ceramic strips. This structure is surrounded by two coaxial interspaces communicating with each other at the upper region of the cylinder mounting the structure itself. In particular, cooling air is admitted into the outer interspace and may be tapped, in a heated condition, off the bottom of the inner interspace for use in subsequent processing operations.

1 Claim, 3 Drawing Figures

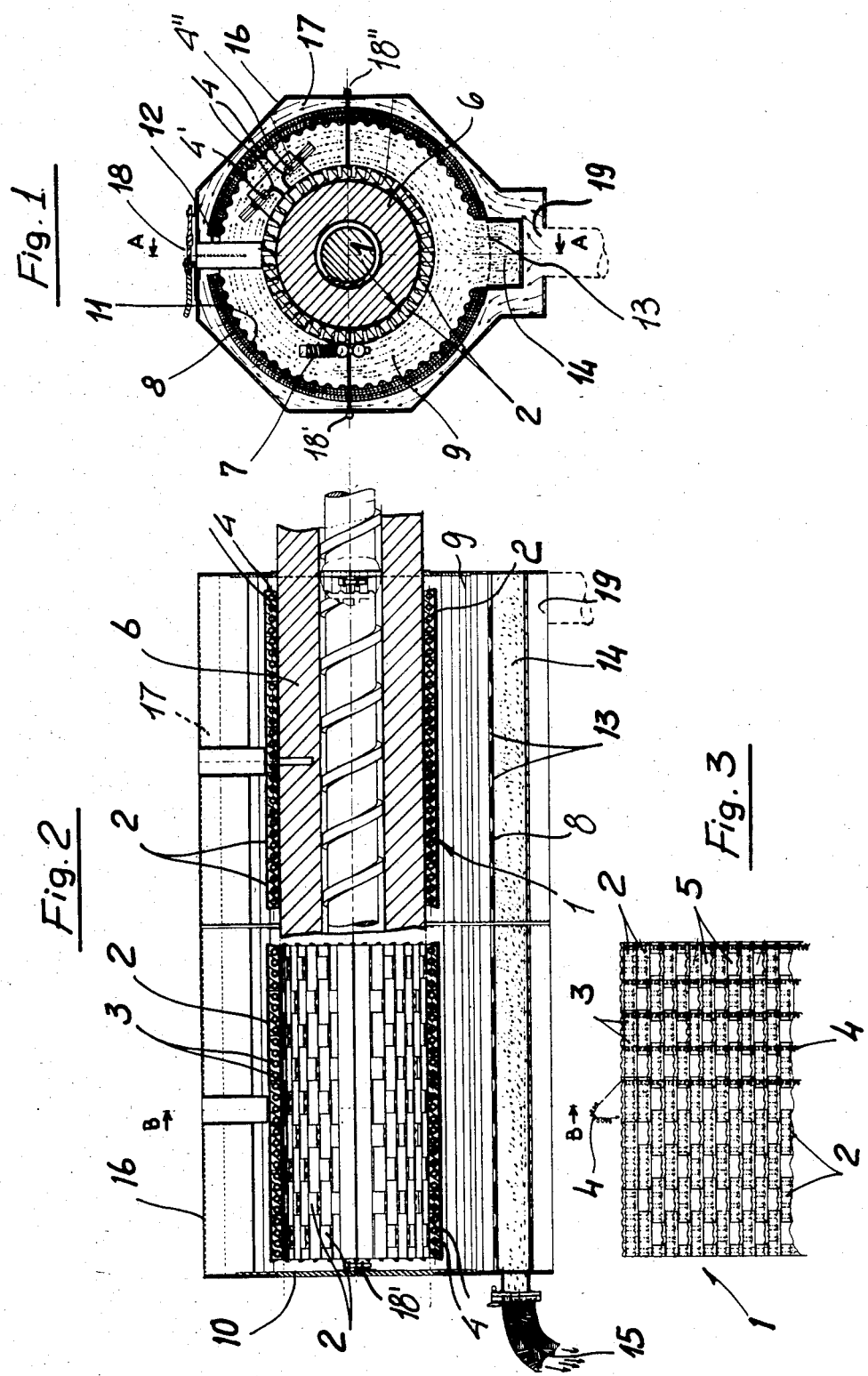

ELECTRIC THERMAL UNIT

BACKGROUND OF THE INVENTION

This invention relates to an electric thermal unit for controllably heating cylinders in extruders and drawing machines for plastics, rubbers, and the like, which unit is so designed and arranged as to define therein a double air circulating interspace.

It is a known fact that some plastomeric and elastomeric material processing operations involve the use of specific equipment (such as extruders, injection presses, and drawing machines) comprising essentially a screw set for rotation within a coaxial cylinder with a limited amount of play.

Also known is that said cylinder must be provided with a heating means controlled by appropriate automatic control systems and effective to suitably soften the material preparatory to its being forced through a forming die (or die plate).

Such heating means conventionally comprises a spiral coil resistance heater which, being laid between suitably shaped ceramic supports, encircles the cylinder.

More specifically, such prior resistance heaters, and related insulating supports, are attached to a ring-like structure formed in two or more parts pivotally connected to one another and being adapted for installation in close contact relationship with the outer surface of said cylinder.

It should be pointed out, however, that said ring-like structure accommodating the resistance heaters undergoes itself an undesired surface heating effect, and may constitute a potential risk for the machine operators.

Furthermore, owing to the natural tendency of heat to flow upwards, the cylinder temperature is at all times slightly above that of the bottom region. This circumstance may originate non-homogeneous areas in the mixture, thereby the finished products may fall short of expectations.

It should be also remembered that conventional electric thermal units are sometimes equipped with a cooling system which can favor a cylinder temperature maintained within suitable ranges for the intended processing.

Such prior systems generally comprise a jacket enclosing the electric thermal unit wherethrough air is circulated which is only intended to provide local cooling, and is accordingly apt to enhance any temperature differential between the upper and lower regions of the extruder cylinder.

SUMMARY OF THE INVENTION

It is a primary object of this invention to obviate such prior deficiencies by providing an electric thermal unit for controllably heating cylinders in extruding and drawing machines, which is constructed to have the outer wall of its case at a constantly low temperature.

A further object of the invention is to provide an electric thermal unit for controllably heating cylinders in extruders, injection presses, and drawing machines, which can promote a uniform distribution of heat through the interiors of the cylinders.

It is another object of this invention to provide an electric thermal unit for controllably heating cylinders in extruding and drawing machines, which enables the spent cooling air to be recovered for subsequent utilization.

These and other objects, such as will be more clearly apparent hereinafter, are achieved by an electric thermal unit for heating cylinders in extruding and drawing machines, according to the accompanying claim.

BRIEF DESCRIPTION OF THE DRAWINGS

Further features and advantages of the electric thermal unit according to this invention will be more readily understood from the following description of a preferred embodiment thereof, as illustrated by way of example only in the various views of the accompanying drawing, where:

FIG. 1 is a cross-sectional view taken along the line B—B of FIG. 2 of this electric thermal unit;

FIG. 2 shows respectively, in longitudinal section, taken along the line A—A of FIG. 1 and with one half of their coverings removed, two units according to the invention as mounted on an extruder cylinder; and FIG. 3 shows a fragmentary plane development of the structure incorporating the resistance heater.

DESCRIPTION OF A PREFERRED EMBODIMENT

With particular reference to the reference numerals in the various drawing views, this electric thermal unit for controllably heating cylinders in extruding and drawing machines comprises a structure, generally indicated at 1, including a plurality of shaped strips 2 which can be mutually secured by coupling together respectively concave and convex sidewalls thereof which have holes 3 formed therethrough.

Such strips are located, in particular, at alternate positions so as to define continuous through holes accommodating the spiral coil resistance heater 4 and bound empty areas 5. To this end, as it should be obvious to those skilled in the art, the strip 2, in order not to short the resistance heater 4, will be made starting from any suitable insulating material, such as a ceramics material and the like. The resistance heater, in turn, is provided with end posts or terminals, 4' and 4", for connections to a suitable electric power source (not shown) and to that end, as it should be apparent, suitably sealed holes (not shown) would be provided through the outer case 16.

Said structure 1, which is bent to a ring-like configuration, or alternatively, made flat, and contacts the surface of the extruder cylinder 6, is fastened to and supported by the latter by means of a suitable locking device 7 and surrounded by a layer of an insulating material 8 defining an interspace 9 and being carried on end discs 10 which extend coaxially to the cylinder.

Said insulating material layer has an inner surface 11 which is grooved and reflective, and includes an upper slot 12 extending through the full length thereof.

At the remote end from said slot, the insulating material layer has a set of openings 13 formed therein which tight converge into a header or heat recovering duct 14 connected for example through a hose 15 to a heat recovery line, the recovered heat being used in other treating steps in the system, for example for preheating or melting the plastics material pellets.

The layer 8 is in turn surrounded by an outer case 16 forming a second interspace 17 and being also supported by said end discs 10 which are hingedly attached (for example at 18' and 18") along their horizontal transverse axis, while the case parts are connected at the top by a closure latch 18. Thus the end discs 10 are effective to support both the insulating material layer 8 and the outer case 16 and, to this end, in order to improve the holding together of the several elements, the discs 10 can be associated to the supported elements by any suitable means, such as welding, riveting, glueing or the like, as it should be apparent to those skilled in the art.

Said outer case defines, in particular, a lower opening 19 wherethrough ventilating air is conveyed into the interspace 17. In particular said ventilating air may be obtained from any suitable source such as, for example, a pressurized air tank, thereto the opening 19 will be coupled, for example, through a hose (shown by the dashed lines and not specifically numbered since it does not pertain to the invention).

In actual practice, the ventilating air, in flowing through said interspace, keeps the outer wall of the case 16 at a sufficiently low temperature.

That same air, on entering the inner interspace 9 from above, will contact the upper portion of the extruder cylinder 6 and apply a cooling action thereto.

Thereafter, the ventilating air sweeps across the grooved surface of the insulating layer 8, assumes a substantially turbulent regime through the empty areas 5 of the structure 1, and establishes an even temperature across the entire wall of the extruder cylinder 6.

Said ventilating air for the electric thermal unit, after picking up heat as described, is recovered over the header 14 and may be advantageously used for a variety of applications.

Among such applications, the following may be mentioned by way of example: furnace heating; dehumidification of hoppers for moist or wet materials; drying; heating flat blow heads, dies, screw taps, etc.

From the foregoing description and observation of the views in the accompanying drawing, the improved functionality and practicality of this invention electric thermal unit for controllably heating cylinders in extruders, injection presses, and drawing machines, may be fully appreciated.

Of course, this electric thermal unit has been described and illustrated by way of example and not of limitation for the sole purpose of showing the practicability and general features of the invention, and many modifications and changes may be introduced as may occur to a skilled person without departing from the true scope of the innovative concepts outlined hereinabove.

I claim:

1. An electric thermal unit for heating an extruder cylinder (6) in extruders, injection presses and drawing machines, comprising an outer casing (16) a plurality of shaped strips (2) positioned within said casing, said strips being mutually coupled to define a substantially annular structure effective to encompass an extruder cylinder and to be supported thereby, said strips including substantially continuous holes (3) housing a heating spiral coil resistance element (4) to be supplied by an outside electric power source, an insulating material layer (8) substantially concentrically arranged around said strips and having an outer surface and a grooved and reflective inner surface (11) which defines with said strips a first inner interspace (9), said outer casing encompassing said insulating material layer and defining with said outer surface of said layer a second outer interspace (17), end discs (10) for supporting said insulating material layer and said outer casing, said outer casing having a bottom and being provided at said bottom with an opening (19) for coupling to a ventilating air source, whereby ventilating air is conveyed through said opening into said second interspace, said insulating material layer having a top and being so arranged as to define, at said top a slot (12) for allowing said ventilating air to enter said first interspace to be heated by said spiral coil heating resistance element, and, at the bottom of said material layer a plurality of openings (13) to be coupled to a heated air recovering duct.

* * * * *